United States Patent Office 3,034,601
Patented May 15, 1962

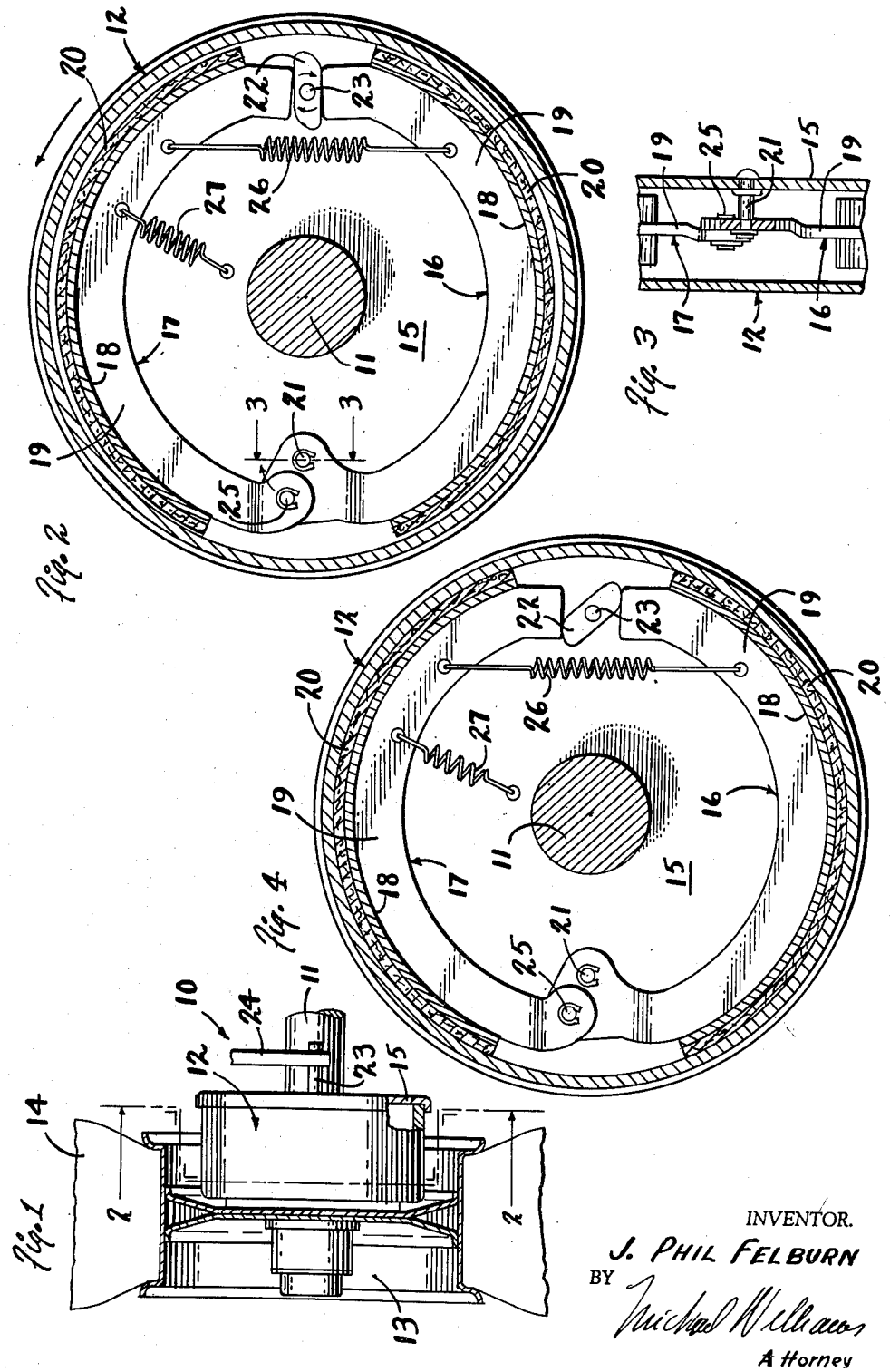

3,034,601
BRAKE CONSTRUCTION
John Phil Felburn, 4160 W. Broad St., P.O. Box 2852,
Columbus, Ohio
Filed Sept. 29, 1959, Ser. No. 843,125
2 Claims. (Cl. 188—78)

The present invention relates to brakes particularly adapted for use with motor vehicles, and the principal object of the invention is to provide new and improved brakes of such character.

Most of the brakes presently used on motor vehicles comprise a pair of arcuate brake shoes arranged in opposed relation to each other within a rotatable drum and with the ends of one shoe adjacent respective ends of the other. Such shoes are normally contracted radially inwardly out of contact with the drum so as to not interfere with its rotation; however, when braking is required, the shoes are moved radially outwardly to engage the drum with a high friction material to thus frictionally retard its rotation.

In one of the most widely used type of modern brakes, one end of each shoe has pivotal connection with the adjoining end of the other while the opposite adjoining ends of such shoes are engaged with the means which forces the shoes radially outwardly to engagement with the drum. While such widely used construction has the desired simplicity and is generally satisfactory, it does possess one disadvantageous feature.

Because of the nature in which the brake shoes are pivoted, one or the other necessarily moves in an arcuate path in the direction of normal rotation of the brake drum. This shoe, therefore, exerts what is known as a self-energizing effect; that is, when this shoe is engaged with the drum, the rotation of the latter tends to pivot such shoe into even tighter drum engagement.

While for certain applications this phenomenon results in a desirable reduction in the amount of pressure required to exert a given braking effect, a corollary thereof is that the pressure required changes markedly with any change in the frictional characteristics of the lining material used on the shoes. Accordingly, to exert a predetermined braking force, one pressure may be required when the brakes are cold while several times as much pressure may be required when the brakes are hot and the coefficient of friction of the lining is therefore reduced. With today's widespread use of power brakes both on cars and on trucks, the amount of force required for a given braking effort is much less important than is consistency of operation.

In an effort to reduce the abovementioned self-energizing effect, many different constructions have been employed with various degrees of success. Unfortunately, however, these constructions relied upon multiple actuating devices and/or complicated lever arrangements or the like to accomplish their purpose.

In contrast, the present invention provides a simple, trouble-free brake construction whose self-energization is reduced to a desirably low level. Other advantages of the present invention will readily become apparent from a study of the following description and from the drawing appended hereto.

In the drawing accompanying this specification and forming a part of this application there is shown, for purpose of illustration, an embodiment which the invention may assume, and in this drawing:

FIGURE 1 is a fragmentary view, partially in section, of one end of a vehicle axle which supports a brake of the present invention, FIGURE 2 is an enlarged sectional view generally corresponding to the line 2—2 of FIGURE 1, FIGURE 3 is a fragmentary sectional view generally corresponding to the line 3—3 of FIGURE 2, and FIGURE 4 is a view similar to FIGURE 2 but showing certain parts in another position.

With reference to FIGURE 1, there is fragmentarily illustrated an axle assembly 10 of the type commonly used on trailers. Such assembly is herein shown to comprise a non-rotatable axle 11 securable to the trailer and having at respective terminal ends (only one of which is shown) the brake drums 12 which are rotatably secured to the axle by any conventional bearing structure. Suitably secured to each brake drum 12 for unitary rotation therewith is the usual wheel 13 mounting any conventional tire 14.

Brake drum 12 is of the usual type having a tubular portion closed at one end by a structurally integral wall so that such drum is of cup-like configuration. Also in the usual manner, the drum is so secured to the axle that its open end faces inwardly of the axle. Suitably affixed to the axle adjacent the open end of the drum is a radially extending member 15 commonly known as the brake backing plate. Plate 15 is, of course, non-rotatable and is closely spaced from the drum to close its open end without interfering with rotation thereof.

Referring now to FIGURE 2, a pair of arcuate brake shoes 16 and 17 are secured to the side of backing plate 15 facing the drum for disposition therewith. As illustrated, such shoes are disposed in opposed relation and with respective ends of one adjoining respective ends of the other. Shoes 16, 17 are conventional in that each comprises a rim portion 18 and a structurally integral web portion 19. The usual high friction lining material 20 is secured to the exterior of the rim portion 18 of the shoes for engagement with the interior of the tubular portion of the drum.

One end of the web 19 of the shoe 16 (that is, the left end in the position of parts viewed) is pivotally secured to the backing plate 15 by means of an anchor pin 21. The right end of such shoe web portion engages with a cam 22 which, in the present embodiment, is rotatable about the axis of a shaft 23 carried by the backing plate 15 in diametrically opposed relation to anchor pin 21. A lever 24 (see FIGURE 1) may be carried by the shaft 23 and such lever, when actuated by a fluid cylinder (not shown) or other force applying mechanism, will rotate the shaft and its attached cam 22.

Returning to the left end of the web of shoe 16, the latter carries a pin 25 which is spaced radially of anchor pin 21 and which serves to pivotally connect the left end of the web portion of shoe 17 to shoe 16. As viewed in FIGURE 3, the left ends of the webs of shoes 16, 17 are off-set slightly in opposite directions to provide for the overlapping of such web portions. The right end of the web portion of shoe 17 engages with the previously mentioned cam 22.

Means are provided for yieldably urging shoes 16 and 17 radially inwardly to the position seen in FIGURE 2 wherein such shoes are disengaged from the drum. Such means presently comprises the usual spring 26 having hooked end portions which pass through appropriate apertures in respective shoe webs. In addition, an auxiliary spring 27 extends between the web of shoe 17 and the backing plate 15 to assist the spring 26.

Operation of the present construction will be as follows: Still referring to FIGURE 2 and assuming the drum 12 to be rotating in the direction of the arrow (such direction corresponding to the normal direction of vehicle movement), the brake pedal or other control on the vehicle which applies the brakes will be actuated to effect rotation of cam 22 in the direction indicated. Such rotation of cam 22 will cause radial outward movement of shoes 16, 17 against the urging of springs 26, 27 to frictionally engage the lining carried thereby with the interior of the drum as seen in FIGURE 4.

It is to be understood that the rotation aforesaid of cam 22 will cause shoe 16 to pivot in an arcuate path about the anchor pin 21 in a direction opposite to that of drum rotation. Such movement of the cam will also cause shoe 17 to pivot about the anchor pin 25 in the same direction as that of drum rotation; however, the pin 25 is not stationary but is carried by shoe 16 and thus moves with the latter in the direction of the arrow seen in FIGURE 2 upon outward movement of shoe 16 toward the drum. Note that the movement of pin 25 is in the direction opposite to that of drum rotation. As a result of the movement aforesaid of the pin 25, radial outward movement of shoe 17 will be so modified that its path of travel approximates that of a straight line.

Because of the approximate straight line path of movement of shoe 17, the tendency of the rotating drum to force shoe 17 into closer engagement with the drum will be reduced, if not completely eliminated; accordingly, self-energization of the shoe 17 will be reduced to at least a minimal value. Self-energization of shoe 16, of course presents no problem since, in moving toward the drum, this shoe pivots in a direction opposite to that of drum rotation.

When the brake is to be disengaged, the force holding cam 22 in the position seen in FIGURE 4 will be released. Springs 26, 27 will thereupon move the shoes 16, 17 radially inwardly and rotate cam 22 in the opposite direction from that before described to the respective positions seen in FIGURE 2.

It is to be understood that while the present invention is concerned with a brake having minimum self-energization, if for any reason it would be desired to provide a brake having maximum self-energization, it would only be necessary to so arrange the parts that the drum will rotate in the opposite direction from that indicated during normal vehicle movement. It is also to be understood that while the use of a cam has been disclosed for urging the shoes into drum engagement, any other conventional device may be employed for this purpose.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A brake construction comprising a brake drum normally rotatable in a predetermined direction and having a cylindrical inner surface, first and second arcuate brake shoes formed for complementary engagement with said brake drum surface and disposed within said brake drum in opposed relation with one end of one shoe adjacent one end of the other, a brake shoe actuator adjacent to and engageable with said adjoining brake shoe ends and operable to urge such ends away from each other to thus urge said shoes radially outwardly to engagement with said brake drum surface, said first shoe extending arcuately from adjacent said actuator in a direction opposite to normal drum rotation and terminating in another end spaced circumferentially from its one end and said second shoe extending arcuately from adjacent said actuator in the direction of normal drum rotation and terminating in another end spaced circumferentially from its one end and adjacent said first shoe other end, a first pivot at said first shoe other end and about which such first shoe is swingable in an arcuate path to drum engagement upon operation of said actuator, and a second pivot connecting the other end of said second shoe with the other end of said first shoe and about which said second shoe is swingable to drum engagement upon operation of said actuator, said second pivot being spaced in a direction opposite to normal drum rotation from a radial line passing through the axis of said first pivot and the rotational axis of said drum to minimize radial outward movement of the other end of said second shoe during radial outward movement of said first shoe.

2. The construction of claim 1 and further comprising primary spring means connecting said one end of respective shoes and yieldably exerting a force thereon in a direction toward each other to urge said shoes away from drum surface engagement, and secondary spring means connected to said second shoe intermediate its ends and yieldably exerting a force on such shoe generally normal to a line passing through said first and second pivots and in a direction to urge said second shoe away from drum surface engagement.

References Cited in the file of this patent

UNITED STATES PATENTS

| | | |
|---|---|---|
| 1,806,297 | Kohr | May 19, 1931 |
| 1,842,885 | Thomas | Jan. 26, 1932 |
| 2,401,938 | Koch | June 11, 1946 |